United States Patent [19]

Cabanaw

[11] Patent Number: 4,908,201
[45] Date of Patent: Mar. 13, 1990

[54] SULFUR RECOVERY PROCESS INCLUDING REMOVAL OF RESIDUAL SULFUR FROM CLAUS CATALYST AFTER REGENERATION

[75] Inventor: Boyd E. Cabanaw, Tulsa, Okla.
[73] Assignee: Amoco Corporation, Chicago, Ill.
[21] Appl. No.: 918,226
[22] Filed: Oct. 14, 1986

Related U.S. Application Data

[63] Continuation-in-part of Ser. No. 824,896, Jan. 31, 1986, abandoned.

[51] Int. Cl.⁴ .............................................. C01B 17/04
[52] U.S. Cl. ................................................ 423/574 R
[58] Field of Search ............................ 423/576, 574 R

[56] References Cited

U.S. PATENT DOCUMENTS 4,035,474  7/1977  Kunkel et al. ................... 423/574 R

FOREIGN PATENT DOCUMENTS 1307716  2/1973  United Kingdom ............ 423/574 R

OTHER PUBLICATIONS

"There are Ways to Smoother Operation of Sulfur Plants", Norman Oil & Gas Journal, Nov. 15, 1976, pp. 55-60.

Primary Examiner—Jeffrey E. Russel
Attorney, Agent, or Firm—L. Wayne White; Fred E. Hook

[57] ABSTRACT

A portion of the acid gas feedstream to a Claus plant is passed through Claus catalyst to strip residual sulfur and sulfur compounds from the catalyst. The resulting gas-in-process containing the stripped compounds can then be provided to a Claus conversion step.

26 Claims, 3 Drawing Sheets

SULFUR RECOVERY PROCESS INCLUDING REMOVAL OF RESIDUAL SULFUR FROM CLAUS CATALYST AFTER REGENERATION

CONTINUATION DATA

This application is a continuation-in-part of application Ser. No. 824,896, filed Jan. 31, 1986, now abandoned.

FIELD OF THE INVENTION

The invention relates to the Claus process production of sulfur from hydrogen sulfide by a partial combustion of hydrogen sulfide to form at least sulfur dioxide and a catalytic reaction of hydrogen sulfide and sulfur dioxide contained in a resulting gas-in-process under conditions including temperature for forming and depositing elemental sulfur on the catalyst. In a particular aspect, the invention relates to removal of sulfur from resulting sulfur laden catalyst (regeneration) followed by a further step of stripping residual sulfur from the catalyst prior to returning the catalyst to operation under adsorption conditions.

BACKGROUND OF THE INVENTION

The technology described in this BACKGROUND OF THE INVENTION is well described in the patent and other literature from which the person skilled in the art can determine operating conditions and parameters for carrying out such processes, including temperatures, sulfur conversion and recovery conditions and times, regeneration conditions and times, cooling conditions and times, and the like.

In a Claus process sulfur recovery plant, an acid gas feedstream comprising hydrogen sulfide is partially combusted with oxygen in a furnace (Claus furnace or Claus thermal conversion zone) to produce at least sulfur dioxide which can then react with hydrogen sulfide by the Claus reaction (see Equation (1) hereinbelow) at high temperatures without catalyst being present to produce elemental sulfur (Claus thermal conversion) and/or which can react in the presence of a Claus catalyst with hydrogen sulfide by the Claus reaction to produce elemental sulfur at lower temperatures (Claus catalytic conversion).

Claus catalytic conversion can be effected under conditions including temperature for continuously removing the resulting elemental sulfur in the form of sulfur vapor from the catalytic reaction zone (above the sulfur dewpoint Claus catalytic conversion) or under conditions including temperature (adsorption conditions) for forming and depositing a preponderance of the resulting elemental sulfur on the Claus catalyst (adsorptive Claus catalytic conversion). In the former process, sulfur can be removed continuously from the resulting gas-in-process by a sulfur condenser. In the latter process, the catalyst having sulfur deposited thereon can be periodically heated to vaporize sulfur from the catalyst, followed by removing sulfur from the resulting gas-in-process by a sulfur condenser. This periodic heating can regenerate the catalyst and restores a high level of activity and can be followed by a cooling period to return the catalyst to a lower temperature for operation under adsorption conditions. Frequently also, Claus catalytic conversion can be effected in a series of Claus catalytic conversion zones with one or more above the dewpoint Claus catalytic conversion zones followed by one or more adsorptive Claus catalytic conversion zones, since lower temperatures in successive reactors favors removal of sulfur compounds from the gas-in-process to lower levels.

Regeneration can be effected by streams richer or leaner in sulfur and sulfur compounds (elemental sulfur, hydrogen sulfide, and sulfur dioxide) than will contact the catalyst when operating under adsorption conditions. It can be desirable, in fact, to regenerate catalyst with streams richer in hydrogen sulfide and sulfur dioxide, because this allows regeneration to be effected concurrently with above the dewpoint Claus catalytic conversion, thereby reducing downtime for a Claus catalytic reactor and potentially reducing the number of Claus catalytic reactors required for achieving a given level of overall sulfur recovery.

A significant problem in maintaining Claus catalyst activity in such plants as hereinabove described is that of preventing or reversing catalyst sulfation. The buildup of sulfate on catalyst surface diminishes catalyst activity and reduces recovery in a plant. It is known that sulfation can occur in regard to low temperature Claus adsorption both during adsorption function or during regeneration function.

Sulfation of Claus catalyst is an equilibrium phenomenon dependent on the concentration, especially of $O_2$, $SO_2$, and $SO_3$ in the Claus process gases, and the temperatures utilized with the catalyst. Sulfation can be reduced from the catalyst by hydrogen sulfide to form elemental sulfur and water vapor. Thus, it is known to reverse catalyst sulfation by passing Claus plant feedstreams comprising essentially only hydrogen sulfide as a sulfur species in contact with sulfated catalyst at a temperature at least higher than that at which the sulfation occurred. If the catalyst temperature in the presence of the hydrogen sulfide is greater than the temperature at which the sulfate was formed, then sulfate levels are reduced below previous equilibrium levels. The rate and degree of sulfate reduction by hydrogen sulfide thus depends upon temperature, hydrogen sulfide partial pressure, and the original temperature of the sulfate formation.

It is well known that the temperature required for reversal of catalyst sulfation must exceed to some extent the temperature of sulfate formation for significant reversal of catalyst sulfation to occur. Thus, it has been recommended to reactivate catalyst which has lost activity using hydrogen sulfide free of sulfur dioxide at temperatures of 190°–350° C. (375°–660° F.) where adsorption of elemental sulfur on catalyst occurs in the range of 110° C. to 160° C. (230°–320° F.) (see British Patent No. 1,307,716). Generally, it is recommended to reverse sulfation by using a hydrogen sulfide stream having an inlet temperature at least 50° F. (28° C.) above the temperature at which sulfation occurs, although it is noted that any increase in the temperature employed during treatment with a hydrogen sulfide-containing stream, even if only 20° F. (11° C.) is of some benefit in reducing sulfation. See, for example, W. S. Norman, "There are Ways to Smoother Operation of Claus Plants," The Oil and Gas Journal, Nov. 15, 1976, pp. 55–60.

INTRODUCTION TO THE INVENTION

Distinct from the problem of preventing or reversing loss of activity due to sulfation of Claus catalyst, however, is the problem of preventing excessive emissions of hydrogen sulfide and sulfur dioxide from Claus plants due to stripping of residual elemental sulfur loading levels which characterize catalyst from which most of the sulfur has been removed during regeneration using a stream richer in both hydrogen sulfide and sulfur dioxide than the catalyst will experience during adsorption function.

Thus, it is desirable to place a freshly regenerated Claus catalytic conversion zone into a final position of a series of Claus catalytic conversion zones and to operate such under adsorptive conditions. In this way, recovery of sulfur is favored because the low residual sulfur loading on the freshly regenerated catalyst and the low temperatures of operation under adsorption conditions can favor the forward Claus reaction and effect a maximal removal of hydrogen sulfide, sulfur dioxide, and produced sulfur from the gas stream passed in contact with the catalyst.

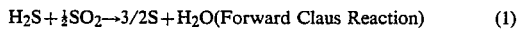

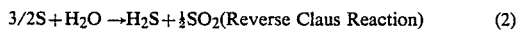

When catalyst in an adsorptive Claus conversion zone is regenerated concurrently with above the dewpoint Claus catalytic conversion, it is regenerated with a stream richer in hydrogen sulfide and sulfur dioxide than will pass in contact with the catalyst in the conversion zone when the conversion zone is operated under adsorptive conditions. In such case, a residual sulfur loading is retained on the catalyst after regeneration is completed due to the equilibrium that is approached or achieved between the catalyst and the species contained in the regeneration gas, including hydrogen sulfide, sulfur dioxide, sulfur vapor produced by the forward Claus reaction, and sulfur vapor already present in the regeneration gas. This residual sulfur loading on the catalyst due to the equilibrium approached or achieved between the catalyst and the richer regenerating gas can result in a "spike" of emissions when a gas leaner in such sulfur and sulfur compounds is passed in contact with the catalyst. As used herein, a "spike period" is a period in which a "spike" occurs, that is, a period during which a greater number of sulfur atoms in the form of elemental sulfur and sulfur compounds leave a reaction zone than enter the reaction zone. The term "emissions" as used herein, shall mean the total atoms of sulfur contained in a stream leaving a reaction zone, or leaving a Claus plant in tail gas (depending on context). The sulfur species can occur in various molecular forms, including $H_2S$, $SO_2$, $S_2$, $S_4$, $S_6$, and $S_8$. This spike is caused in part by the leaner gas physically stripping residual elemental sulfur from the catalyst, and in part, by the reverse Claus reaction initially being favored when the reactor is placed in an adsorptive position in the presence of such cooler, leaner gas, for example, in a final position of a series of Claus catalytic conversion zones. The reverse Claus reaction can remove the residual sulfur from the catalyst in the form of hydrogen sulfide and sulfur dioxide; and the physical stripping mechanism removes the sulfur from the catalyst in the form of elemental sulfur. Some additional reverse Claus reaction converting sulfur and water to hydrogen sulfide and sulfur dioxide can also occur in the gaseous phase. As the reactor cools, the rates of stripping and reverse Claus reaction slow until the spike disappears. The spike period typically is on the order of only a few minutes although sulfur emissions from the reactor typically continue to decline for a period of 1-2 hours before levelling off at some lower level. The spike period, that is the brief period of increased emissions, has a small but measurable deleterious effect on overall sulfur recovery, and more importantly, can cause the plant not to meet environmental standards for emissions, since environmental regulations also place limits on instantaneous or short term recovery in addition to average overall recovery.

A sulfur condenser might be employed downstream of the final position Claus catalytic reaction zone. However, while a sulfur condenser can mostly eliminate any temporary increase in sulfur emissions due to the presence of elemental sulfur, the condenser has no effect on any temporary increase in emissions due to hydrogen sulfide and sulfur dioxide.

However, where an adsorptive Claus catalytic reaction zone is downstream of the freshly regenerated reactor during the period when the increased emissions occur, then hydrogen sulfide and sulfur dioxide can be removed by the forward Claus reaction concurrently with the removal of elemental sulfur by adsorption on the catalyst in that zone. This has the further advantage of eliminating the need for a sulfur condenser downstream of the adsorptive Claus catalytic reaction zone in the final position, since the sulfur is being removed from the gas stream by adsorption on the catalyst.

Following regeneration using a stream richer in sulfur and sulfur compounds than will contact the catalyst in the catalytic conversion zone when operated under adsorption conditions, it has been suggested to generate a stripping gas in-situ from a gas-in-process to remove the residual sulfur on the catalyst to a very low level. The stripping gas an be generated, for example, by forming and condensing sulfur from the regenerating gas itself on the catalyst being conditioned and passing the resulting leaner stream through a remaining portion of the catalyst and stripping residual sulfur therefrom, then passing the resulting gas-in-process from the catalytic conversion zone undergoing such treatment to an adsorptive Claus catalytic conversion zone downstream to remove the stripped-off compounds. This method is effective and advantageous, but results in sulfur being deposited again on the initial portion of the catalyst in the freshly regenerated catalytic conversion zone from which sulfur has just been removed, thus reducing the time that the reactor or zone can be employed for adsorptive Claus conversion.

Alternatively, the Claus catalytic conversion zone after regeneration can have the entire bed of catalyst therein cooled to a low temperature about that of the gas introduced into the zone when operated under adsorption conditions prior to operation under such adsorption conditions. However, to cool a complete bed of catalyst to about operating temperature during adsorption requires several times more time than stripping residual sulfur from the catalyst.

Accordingly, there is advantage to be achieved by providing a process for stripping residual sulfur from Claus catalyst prior to operation under adsorption conditions in which during the stripping period none of the catalyst in the reactor becomes laden with sulfur. It is a further advantage to provide such a process which can be used in connection with preparing catalyst regenerated with a gas richer in sulfur and sulfur compounds than will contact the catalyst when operating under adsorption conditions so as to substantially reduce or eliminate the temporary increase in sulfur emissions which can otherwise occur when such catalyst is employed under adsorption conditions, for example, in a final position of a series of Claus catalytic conversion zones. It is a further advantage to provide such a process which can substantially reduce or eliminate such a temporary increase in emissions without requiring that the entire bed of catalyst be cooled to about operating temperatures during adsorption prior to operation under such adsorption conditions. It is a further advantage to provide such a process which can remove water from the catalyst being stripped thus drying the catalyst and freeing additional catalyst active sites for the subsequent adsorption period. These advantages and others which will be apparent to those skilled in the art from the description hereinafter set forth can be accomplished by the invention herein described in its various aspects and embodiments.

SUMMARY OF THE INVENTION

In accordance with the invention, a portion of the acid gas feedstream to a Claus plant comprising a thermal conversion zone and at least one (one, two, or more) Claus catalytic conversion zones can be passed through catalyst in a Claus catalytic conversion zone at a rate and for a time effective for stripping and removing residual sulfur and sulfur compounds from such catalyst to a level such that emissions from such zone after being placed on-stream with a feedstream leaner in sulfur and sulfur compounds than used before thus passing said leaner stream therethrough at least do not exceed the quantity of sulfur atoms in the elemental sulfur and sulfur compounds entering such zone. The temperature of the acid gas feedstream used for such stripping of residual sulfur compounds in accordance with the invention can be any temperature lower than the temperature at which sulfur formed is deposited on catalyst during adsorption function. These temperatures are effective for the physical stripping of residual sulfur compounds and are characteristic of the temperatures of acid gas feedstreams to Claus plants so that heating of the acid gas feedstream prior to stripping of residual sulfur is not required. The portion of acid gas feedstream passed through the reactor removes residual sulfur and sulfur compounds from the catalyst therein and the resulting gas-in-process containing the removed sulfur and sulfur compounds can be provided to a zone for the recovery of sulfur. According to one aspect of the invention, the resulting gas-in-process can be provided to a thermal conversion zone where the components are combusted together with hydrogen sulfide in the acid gas feedstream. In addition or in the alternative, the resulting gas-in-process containing the removed sulfur components can have the ratio of $H_2S:SO_2$ therein adjusted to about 2:1 and can be provided to a downstream Claus catalytic reaction zone.

In a further aspect of the invention, the invention comprises partially combusting the hydrogen sulfide in the acid gas feedstream to sulfur dioxide in a thermal conversion zone and then reacting resulting sulfur dioxide with hydrogen sulfide in the presence of an effective Claus catalyst for the production of sulfur by the Claus reaction under adsorption conditions including temperature for forming and depositing a preponderance of the sulfur on catalyst therein; then regenerating the resulting sulfur-laden catalyst by vaporizing the thus deposited sulfur therefrom in the presence of a gas-in-process richer in sulfur and sulfur compounds than in the gas contacting the catalyst under said adsorption conditions; after regeneration, passing a portion of the acid gas feedstream in contact with the freshly regenerated catalyst; and then returning the thus regenerated catalyst having residual sulfur compounds removed to operation under adsorption conditions.

In accordance with a further aspect of the invention, a portion of an acid gas feedstream to a Claus plant comprising Claus catalytic conversion zones can be passed through freshly regenerated catalyst in a first Claus catalytic reactor while a second Claus catalytic reactor is downstream thereof operated under adsorption conditions for forming and depositing a preponderance of elemental sulfur on catalyst therein. The ratio of hydrogen sulfide to sulfur dioxide in the resulting gas-in-process can be adjusted to the about 2:1 ratio appropriate for efficient Claus conversion and provided to the second, downstream reactor operated under adsorption conditions.

As indicated, a portion of acid gas feedstream is passed through the catalyst at a rate and for a time effective for stripping residual sulfur and sulfur compounds from the catalyst to a level such that emissions from such zone after being placed on-stream with a feedstream leaner in sulfur and sulfur compounds than utilized for regeneration at least do not exceed the quantity of sulfur and sulfur compounds entering such zone.

The acid gas feedstream to the Claus plant comprises as a sulfur species essentially only hydrogen sulfide and does not include an oxidant such as free oxygen in amounts which can lead to significant sulfation of the catalyst during conditioning of catalyst in accordance with the invention. Further, preferably, the level of hydrocarbons in such stream, especially heavier hydrocarbons such as $C_3$, $C_4$, and heavier, are present only in minor amounts. As used herein, the phrase comprising as a sulfur species essentially only hydrogen sulfide means that the hydrogen sulfide:sulfur dioxide ratio in the acid gas feedstream is at least 5:1, or preferably higher such as 10:1, or even higher. Further, as used herein, the phrase substantially in the absence of an oxidant such as oxygen means that the oxygen is present in amounts of less than 1% of the total volume of the acid gas feedstream, and more preferably less than about 0.1%. It will be appreciated by those skilled in the art that the presence of any significant amounts of oxygen in the acid gas feedstream can lead to sulfation of catalyst during conditioning in accordance with the invention; and that presence of heavier hydrocarbons can lead to coking of the catalyst during conditioning and accordance with the invention. Accordingly, it may be desirable, if necessary, to remove oxygen and such heavier hydrocarbons from such an acid gas feedstream to a Claus plant prior to use for conditioning of catalyst in accordance with the invention. However, as known to those skilled in the art, generally oxygen will not be present; and such heavier hydrocarbons are typically present only in certain applications.

The inlet temperature of the acid gas feedstream to the Claus plant when used for stripping residual sulfur from catalyst is preferably the same as the temperature of the feedstream to the Claus unit. Thus, the temperature of the acid gas feedstream when used for conditioning catalysts in accordance with the invention can be in the range of abut 50° F. or even lower to as high as about 300° F., preferably in the range of about 50°-180° F., typically in the range of about 80°-140° F. Those skilled in the art will appreciate that as the acid gas feedstream passes through the hot catalyst and strips residual sulfur from the catalyst, at least the initial portion of the catalyst will undergo cooling toward a suitable temperature for adsorption. Those skilled in the art will recognize that temperatures in accordance with the invention are always cooler than the inlet temperatures to the Claus catalytic reactors, even to those operating under Claus adsorption conditions. Use of the acid gas feedstream further will remove water from the catalyst during treatment, further increasing catalyst activity.

Typically, the inlet temperatures of the acid gas feedstream and the times for stripping of residual sulfur from catalysts in accordance with the invention will not be significantly effective for reversing sulfation of catalyst. This is in part because the temperatures effective for stripping residual sulfur from catalyst can be far lower than that required for reversing sulfation and more especially because the time required for stripping residual sulfur to a suitable level in accordance with the invention can be far shorter than the time typically required for significant reversal of sulfation. The effective rate and time for acid gas stripping of residual sulfur from catalysts can be readily determined by one skilled in the art by monitoring emissions from a reactor after acid gas treatment. In practice, it will be desirable to use a significant portion of the acid gas feedstream to the Claus plant for acid gas conditioning in accordance with the invention, for example, about 1/6th or more of the acid gas feedstream can be used for such conditioning. As discussed below in connection with the illustrated embodiments, about $\frac{1}{3}$, about $\frac{2}{3}$, or all of the acid gas feedstream can be so employed. Persons skilled in the art will further be able to adjust operation of the Claus plant so as to utilize any desired portion of the acid gas feedstream for conditioning in accordance with the invention.

Any throughput of the Claus plant acid gas feedstream through the catalyst can effect some stripping of residual sulfur from the catalyst and the stripping can preferably be continued until the emissions from the reactor after stripping at a given rate and after being placed in a position operated under adsorption conditions, at least do not exceed the amount of sulfur components entering into the reactor.

The time is preferably determined such that the time required for regeneration of catalyst and the time required for acid gas conditioning of catalyst in accordance with the invention combined are less than an adsorption period for the conversion zone when operated under adsorption conditions. Preferably, between about five minutes and about 3 hours can be effective, most preferably, between about $\frac{1}{2}$ hour and about 2 hours.

By stripping residual sulfur from catalyst in accordance with the invention, the stripping can be accomplished in a shorter period of time compared to methods discussed above in the INTRODUCTION TO THE INVENTION which use a gas-in-process in the Claus plant for such stripping because the acid gas feedstream is essentially lacking in sulfur vapor and sulfur dioxide as compared with the gases in process within the Claus plant. Hence, both physical stripping and the reverse Claus reaction are favored in comparison with such gas-in-process streams. Further, the need for cooling the entire catalyst bed to about adsorption temperature prior to resuming operation under adsorption conditions can be eliminated (although conditioning in accordance with the invention can be followed by precooling of a reactor if desired as known in the art before being switched to a stream from which adsorption occurs), and the effective period during which the reactor having catalyst operated under adsorption conditions can be extended due to the fact that no sulfur has been deposited on the catalyst during such conditioning because of the absence of both sulfur and the Claus reactant sulfur dioxide in the acid gas feedstream used as the conditioning gas in accordance with the invention. Further, since the Claus plant acid gas feed stream is relatively dry compared to Claus process gas, typically containing only 3-5% water as compared to 25-35% water in process gas, the catalyst can be stripped of residual water loading in a fashion analogous to sulfur stripping during such conditioning freeing more sites for the subsequent adsorption. Water produced by forward Claus reaction during the subsequent adsorption period can be adsorbed again onto these sites freed during the conditioning period. By removing the water and sulfur products from the process gas during the adsorption period, the equilibrium of the Claus reaction can be driven further forward, enhancing recovery.

The invention will be further understood and appreciated by those skilled in the art from the following description and the drawings in which:

FIG. 1 illustrates a first embodiment of the invention in which a resulting gas-in-process containing removed sulfur components has the ratio of hydrogen sulfide:sulfur dioxide therein adjusted to about 2:1 and is provided to a downstream Claus catalytic reaction zone. Specifically, FIG. 1A illustrates an embodiment of the invention in which a first catalytic reactor is operated under above the dewpoint Claus catalytic conversion conditions concurrently with regeneration of the catalyst therein and a second catalytic reactor is operated under adsorption conditions; and FIG. 1B illustrates such embodiment of the invention during the period when a portion of the Claus plant acid gas feedstream is passed in contact with freshly regenerated catalyst for stripping residual sulfur and sulfur compounds therefrom.

FIG. 2 illustrates an embodiment of the invention in which a resulting gas-in-process containing removed sulfur components from a catalytic reaction zone is provided to a Claus furnace where such components are combusted together with hydrogen sulfide in the acid gas feedstream.

DESCRIPTION OF THE ILLUSTRATED EMBODIMENTS

As indicated, FIG. 1 illustrates an embodiment of the invention in which a resulting gas-in-process containing removed sulfur components has the ratio of hydrogen sulfide:sulfur dioxide therein adjusted to about 2:1 and is provided to a downstream Claus catalytic reaction zone.

Figure 1A:
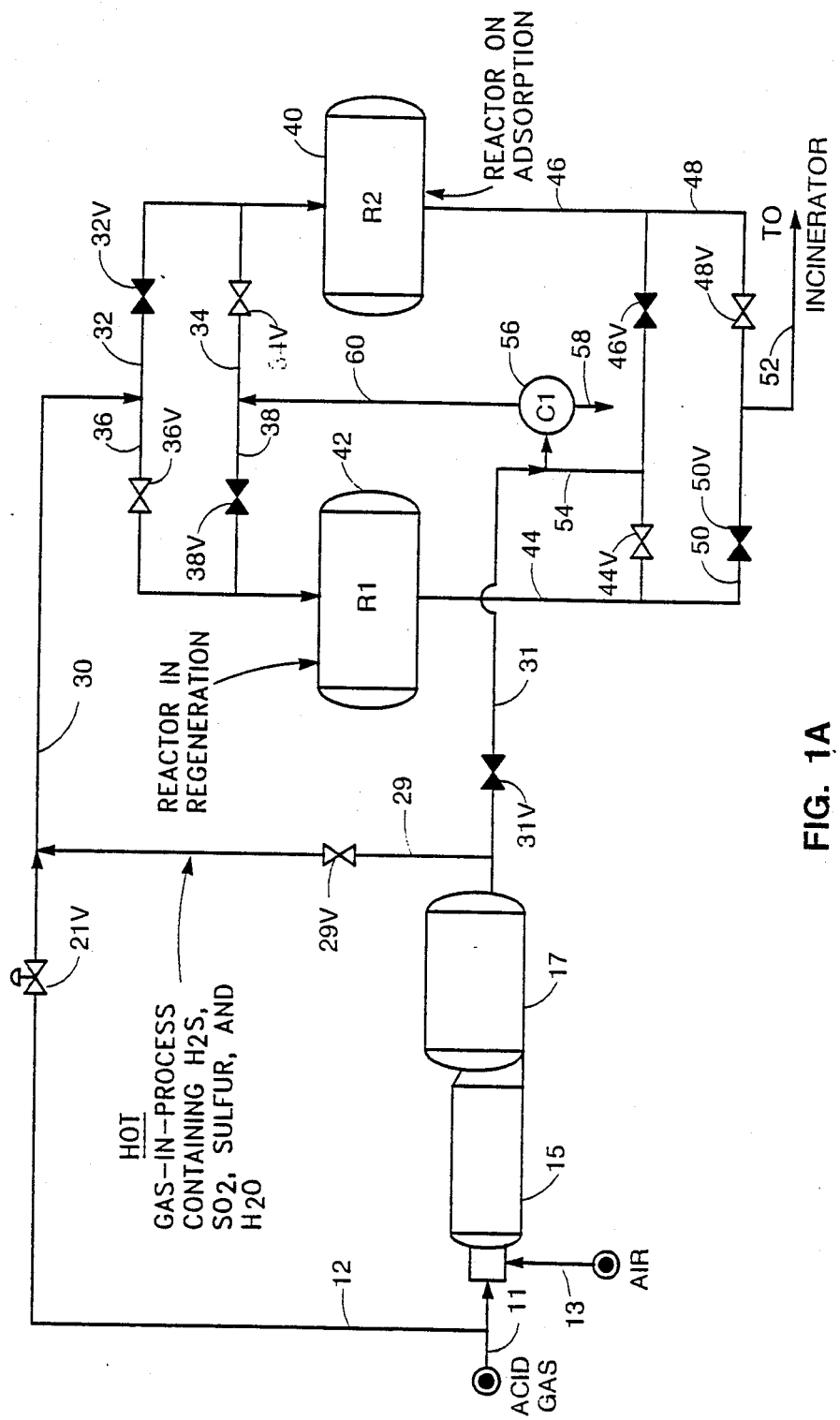

Referring now in detail to FIG. 1A, the Claus plant acid gas feedstream comprising as a sulfur component predominantly hydrogen sulfide and essentially lacking in oxidant such as oxygen can be introduced, as is known, by line 11 with air or other source of oxidant by line 13 into Claus furnace 15 where Claus thermal conversion can occur and/or where a portion of the hydrogen sulfide can be converted to sulfur dioxide for subsequent Claus catalytic conversion. The Claus furnace effluent can then be passed through waste heat boiler 17, line 29, and valve 29V before mixing with a portion of acid gas which can bypass the furnace in line 12 and valve 21V and can then be provided by line 30, line 36 and valve 36V to first catalytic reaction zone 42 (R1). The temperature of the effluent from the waste heat boiler 17 can be selected such that the temperature of the process gas in lines 30 and 36 is suitable for above-the-sulfur dewpoint catalytic conversion. For acid gases richer in hydrogen sulfide, it may be advantageous to use a sulfur condenser (not shown) in line 29 to remove sulfur vapor and to then reheat this gas by suitable means so that the temperature to reactor 42 (R1) is suitable for above-the-sulfur dewpoint Claus catalytic conversion. Operation of the Claus furnace, as described herein, including use of condensers, reheat methods, and the like, will readily be apparent to those skilled in the art from the common knowledge of the art in designing Claus plants and from the description herein provided.

It will be apparent to those skilled in the art that the first catalytic conversion zone R1 or R2 in the illustrated embodiment can comprise one, two, or more Claus catalytic reactors operated above the sulfur dewpoint and that the second Claus catalytic conversion zone R2 or R1 can likewise comprise one, two, or more Claus catalytic reactors operated under adsorption conditions. Sulfur condensers and/or reheaters between such succeeding reactors can be employed as is known in the art to remove sulfur from the process gas and to adjust the temperature of the sulfur denuded gas to appropriate temperature for further Claus catalytic conversion. Accordingly, the invention should not be construed to be limited by the illustrated embodiment, but in accordance with the claims appended hereto.

When the first Claus catalytic conversion zone R1 or R2 comprises a single Claus catalytic reactor, the temperature of the acid gas feed to the reactor should be in the range of from above the sulfur dewpoint to about 700° F. preferably, in the range of from about 425° to about 650° F., most preferably in the range of from about 475° to about 575° F. Where more than one Claus catalytic reactor is used in the first catalytic conversion zone R1, the temperatures can broadly be in the same range, but it is advantageous in such case that the feed temperature of each succeeding reactor be somewhat reduced compared to the feed temperature to the preceding reactor for the purpose of enhancing recovery.

Likewise, when the second Claus catalytic conversion zone comprises a single Claus catalytic reactor, the inlet temperature of the feed gas can be broadly in the range from about 100° F. to about 330° F., preferably in the range of about 260° F. to about 320° F. Where more than one reactor is used in the second Claus catalytic conversion zone the increasingly lean gas can facilitate using lower temperatures in the successive zones to enhance recovery.

Following operation of a reactor in the second Claus catalytic conversion zone under adsorption conditions, the reactor and/or the catalyst therein can be placed in the first Claus catalytic conversion zone operated under above the sulfur dewpoint conditions for effecting forward Claus conversion and concurrently regenerating the catalyst. Regeneration of the catalyst can be effected by the same temperatures as are used for above the sulfur dewpoint conversion and the period required for regeneration can be readily determined from the common knowledge of those skilled in the art.

Those skilled in this art area will recognize that regeneration can occur in three phases, the three phases comprising an initial heat-up phase, a plateau phase, and a final heat-up phase. In the first phase, the hot regeneration stream heats the sulfur-laden catalyst to a temperature effective for vaporizing adsorbed elemental sulfur from the catalyst. During the plateau phase, sulfur is being removed from the catalyst by vaporization and substantially all of the heat available in the hot regeneration gas is used to vaporize sulfur with little or no heat being available to heat the catalyst to a higher temperature. After a substantial portion of the sulfur has been removed from the catalyst, the temperature can further rise as vaporization of sulfur continues at a reduced rate. Concurrently with the removal of sulfur from the sulfur-laden catalyst, the catalyst is regenerated, and facilitates the forward Claus reaction at temperatures above the sulfur dewpoint.

FIG. 1A illustrates operation of the Claus plant during the time when the reactor 42 (R1) is operating under above the sulfur dewpoint Claus catalytic conversion conditions, concurrently regenerating catalyst in the reactor R1; and the reactor 40 (R2) is operated under adsorption conditions. Thus, the gas in line 30 can be provided by line 36 with valve 36V to reactor 42 (R1). In the reactor 42, the above the sulfur dewpoint Claus catalytic conversion of hydrogen sulfide and sulfur dioxide in the presence of an effective Claus catalyst such as alumina takes place. The sulfur formed is continuously removed from the reactor in the form of sulfur vapor; and concurrently, sulfur that was deposited on the catalyst during previous operation of the reactor under adsorption conditions can be vaporized and removed therefrom. The sulfur from the reactor 42 in the vapor state can be removed by line 44 with valve 44V and provided by line 54 to sulfur condenser 56 (C1) where the stream can be cooled to condense sulfur and liquid elemental sulfur can be removed by line 58.

The resulting sulfur denuded stream from the sulfur condenser 56 can then be provided by line 60 and line 34 with valve 34V to the second Claus catalytic conversion zone 40 (R2) operated, for example, under adsorption conditions. The stream in line 34 can be introduced, for example, into the reactor 40 at about the condenser effluent temperature, for example, about 260°, and sulfur can be formed from hydrogen sulfide and sulfur dioxide from such gas stream in the presence of the Claus conversion catalyst and a preponderance (more than half, and preferably substantially all) of the sulfur formed can be deposited on the catalyst therein producing a sulfur lean stream in line 46 which can be removed by line 48 with valve 48V, and line 52 to an incinerator.

After sulfur has been deposited on the catalyst in reactor 40 (R2) to a significant extent but preferably to an extent less than that which causes the overall recovery from the plant to decline, the reactor in the second position can be moved into the first position for above the dewpoint operation with concurrent regeneration of the sulfur laden catalyst by closing valves 36V, 34 V, 44 V, and 48 V in the respective lines 36, 34, 44, and 48; and by opening valves 32V, 38V, 46V, and 50V in the respective lines 32, 38, 46, and 50. In this mode of operation, the reactor R1 can be operated in the second position under absorption conditions and the reactor R2 can now be operated in the first position under above the sulfur dewpoint catalytic conditions for the recovery of sulfur and for concurrent regeneration of sulfur-laden catalyst therein.

Figure 1B:
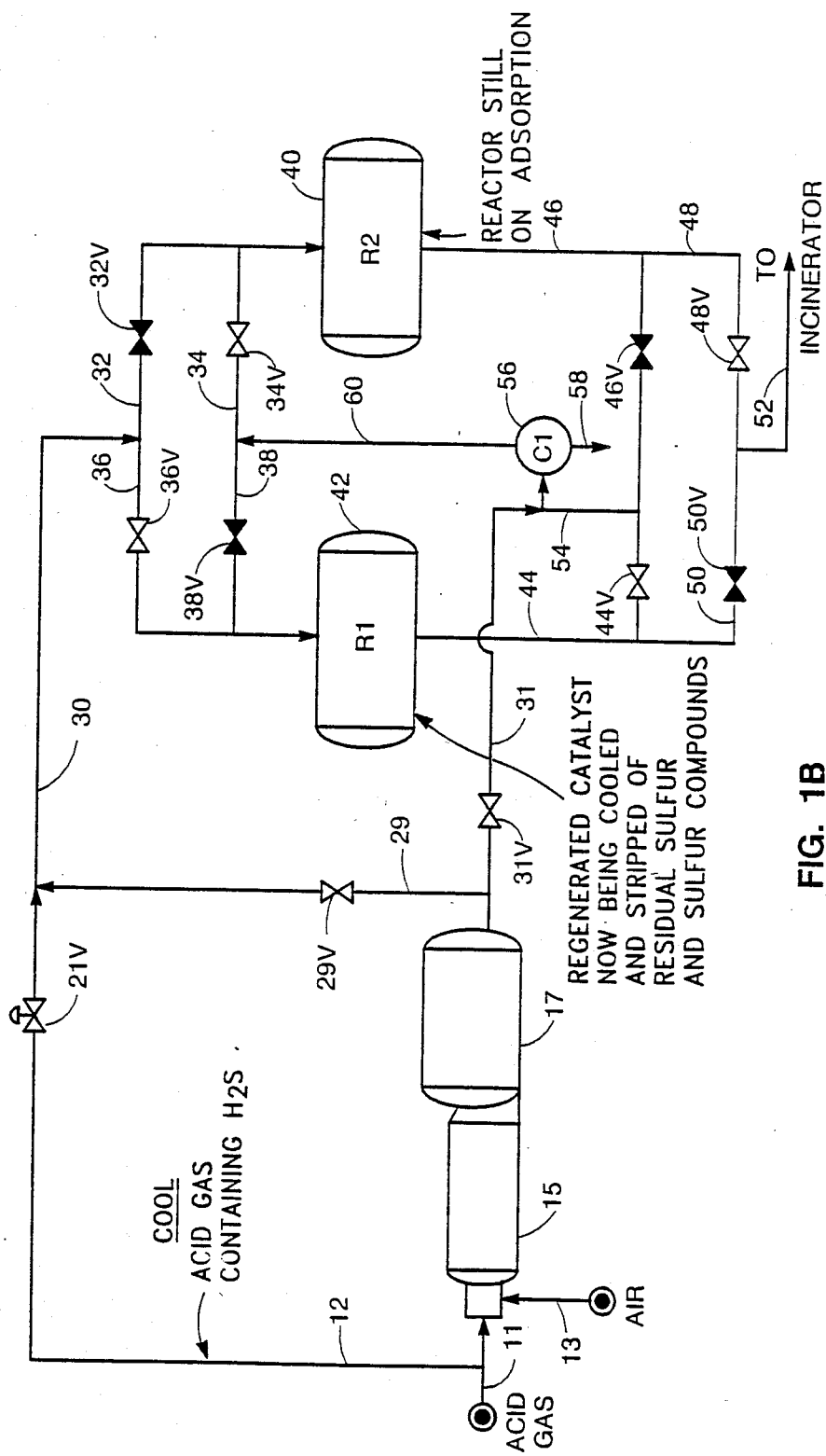

Referring now to FIG. 1B, FIG. 1B shows the illustrated embodiment of FIG. 1A after regeneration of the sulfur-laden catalyst in the reactor 42 has been completed during first position operation and prior to placing the reactor R1 into the second position for operation under adsorption conditions. FIGS. 1A and 1B employ the same reference numerals. To pass a portion of the Claus plant acid gas feedstream in contact with the freshly regenerated catalyst in reactor R1, valve 29V can be closed and valve 31V can be opened (compare FIG. 1A where valve 29V is illustrated as open and valve 31V is illustrated as closed) and the gas in line 31 can be passed around reactor R1 without heating and provided directly to reactor R2 via sulfur condenser 56, line 60, line 34, and valve 34V. Control valve 21V can be used to control flows. At least a portion of the Claus plant acid gas feedstream can be passed via line 12, valve 21V, lines 30 and 36 with valve 36V directly to reactor R1.

The portion of Claus plant acid gas feedstream can be passed through the regenerated catalyst for a suitable period of time for stripping which can be determined as described above. For the purpose of stripping residual sulfur from the catalyst, the stripping will be effective to at least some extent in virtually any period of time for stripping some of the residual sulfur therefrom. However, it is preferred to continue the stripping until any spike in emissions observed immediately upon switching to operation under adsorption conditions is significantly reduced, for example, reduced to a point where the emissions from the reactor are at least no greater than the total sulfur atoms entering the catalyst bed; and more preferably, until such emissions are reduced to less than about 10% higher than the level of emissions under adsorption conditions after the entire active bed of catalyst achieves its equilibrium temperature profile at the temperature of the inlet feed gas to the reactor during adsorption conditions. This time for stripping can be readily determined by the person skilled in the art, for example, by observing the composition of the effluent from such reactor, for example, by observing a Continuous Stack Emissions Monitor and determining the time required to eliminate the desired portion of the otherwise higher emissions.

As indicated above, the stream exiting the reactor being stripped using the Claus plant acid gas feed stream will contain as a sulfur species predominantly hydrogen sulfide. Downstream of such a reactor, the hydrogen sulfide to sulfur dioxide ratio can be adjusted by any convenient means. In the illustrated embodiment of FIG. 1, the adjustment can be effected by controlling the flow of airstream 13 to furnace 15 such that approximately one-half mole of oxygen is provided per mole of hydrogen sulfide entering the plant in the acid gas feedstream 11 so that the sulfur dioxide in line 31 when combined with the stream in line 54 results in an $H_2S:SO_2$ ratio of about 2:1. This flow can be controlled by means of tail gas analyzers or the like as is known to those skilled in the art. Those skilled in the art will also appreciate that other means for adjusting the hydrogen sulfide:sulfur dioxide ratio can also be utilized, for example, use of inline burners to oxidize a portion of the gas to sulfur dioxide, catalytic oxidation of hydrogen sulfide to sulfur dioxide and the like.

Figure 2:
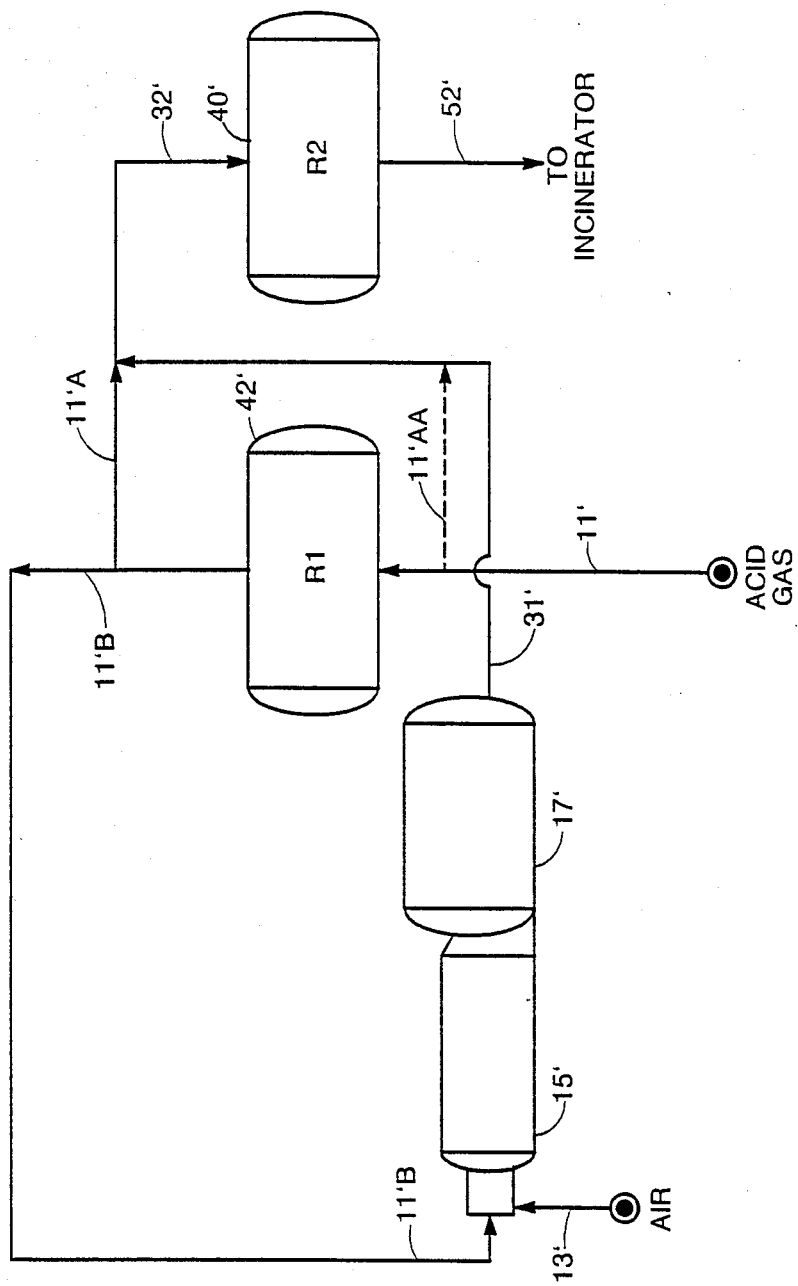

Referring now to FIG. 2, FIG. 2 as indicated illustrates an embodiment of the invention in which a resulting gas-in-process containing removed sulfur components is provided to a Claus furnace where the components are combusted together with hydrogen sulfide in the acid gas feedstream.

Referring now in detail to FIG. 2, an acid gas stream in line 11' can be passed in contact with freshly regenerated catalyst in reactor 42' (R1) and the resulting gas in process can be provided by line 11'B to the Claus furnace 15' where it can be combusted with air or other oxidants provided by line 13' to produce an effluent stream which can be cooled in waste heat boiler 17' to result in a sulfur dioxide containing stream in line 31'. The sulfur dioxide containing stream in line 31' can have the hydrogen sulfide:sulfur dioxide ratio at about 2:1 when it exits the Claus thermal reaction zone by appropriately controlling the oxidant feed. Alternatively, a portion of the acid gas feedstream in line 11' can be diverted by line 11'A or line 11'AA to adjust the ratio of hydrogen sulfide:sulfur dioxide to about 2:1 and the resulting stream can then be provided by line 32' to reactor 40' (R2) where additional Claus catalytic conversion can take place. In a preferred embodiment, reactor R2 can be operated under adsorption conditions. As indicated above, each of Claus catalytic conversion zones 42' and 40' can actually comprise one or more high temperature Claus catalytic conversion zones and/or one or more adsorptive Claus catalytic conversion zones with associated sulfur condensers and reheaters or coolers as appropriate. The resulting gas reduced in sulfur and sulfur compounds from reactor R2 can then be provided by line 52' to an incinerator.

It will be appreciated that about ⅓ of the acid gas feedstream can be passed through reactor R1 with about ⅔ passed by line 11'AA, or that about ⅔ of the acid gas feedstream can be passed through reactor R1 with about ⅓ passed by each of lines 11'A and line 11'AA, or that all of the acid gas feedstream can be passed through reactor R1 with a portion passed by line 11'A, and the like, and still be consistent with achieving a 2:1 ratio of hydrogen sulfide to sulfur dioxide in the feedstream to reactor R2. The person skilled in the art from the description of the invention herein set forth and the common knowledge of persons skilled in the design and operation of sulfur recovery facilities can thus select any appropriate portion of the acid gas feedstream to be passed through a catalytic reaction zone to effect stripping of residual sulfur from catalyst after regeneration in a desired period of time.

From the above it will appreciated by those skilled in the art that there has been provided a method for stripping residual sulfur from catalyst which has been regenerated utilizing an acid gas stream richer in sulfur and sulfur compounds than the catalyst in the reactor will experience when operated under adsorption conditions for the purpose of significantly reducing sulfur emissions which can otherwise occur when the thus regenerated reactor is moved into a final position of a series of reactors operated under adsorption conditions.

It will be further appreciated by those skilled in the art that the invention can be applied to many other sequences of operation involving above the dewpoint Claus catalytic conversion and operation under adsorption conditions, and therefore that the invention is not limited to the illustrated embodiment provided herein, but by the scope of the claims appended hereto.

What is claimed is:

1. In a Process for the recovery of sulfur comprising passing an acid gas feedstream having as a sulfur species essentially only hydrogen sulfide therein to a Claus plant comprising a thermal conversion zone and at least one Claus catalytic reaction zone operated under adsorption conditions including temperature for forming and depositing a preponderance of sulfur formed on catalyst therein, the steps of:

vaporizing deposited sulfur from the resulting sulfur-laden catalyst in said Claus catalytic reaction zone in the presence of a gas-in process richer in hydrogen sulfide and sulfur dioxide than the gas contacting the catalyst under said adsorption conditions, then stripping residual sulfur and sulfur compounds from the catalyst resulting from such vaporizing step by passing a portion of the acid gas feedstream comprising as a sulfur species essentially only hydrogen sulfide through catalyst in said Claus catalytic conversion zone at a inlet temperature less than the inlet temperature of gas into said catalytic conversion zone during adsorption conditions and at a rate and for a time effective for stripping residual sulfur and sulfur compounds from the catalyst to a level such that emissions from such zone after being placed on-stream with a feedstream leaner in sulfur and sulfur compounds than utilized before thus passing the portion of the acid gas feedstream to the Claus plant therethrough at least do not exceed the quantity of sulfur atoms entering such zone;

providing the resulting gas-in-process containing the thus stripped sulfur and sulfur compounds to a Claus conversion step; and returning the catalytic reaction zone having catalyst thus stripped of residual sulfur and sulfur compounds to adsorption conditions with a feedstream leaner in hydrogen sulfide and sulfur dioxide than utilized during the vaporizing step, thereby preventing emissions from such zone after being placed on stream with such feedstream from exceeding the quantity of sulfur atoms entering such zone during adsorption.

2. In a sulfur recovery process comprising passing an acid gas feedstream, having H2S as essentially the only sulfur species therein, to a Claus plant comprising (a) a thermal conversion zone, and (b) at least two Claus catalytic reaction zones, at least one of which is operated under adsorption conditions including temperature, for forming and depositing a preponderance of sulfur formed on a catalyst therein, while another catalytic reaction zone is being regenerated and/or cooled, the improvement comprising:

(1) regenerating the Claus catalyst in a first catalytic reactor zone by vaporizing sulfur deposited on the catalyst using a stream of gas-in-process whose temperature is above the sulfur dewpoint and whose composition is richer in H2S and SO2 than the gas contacting the catalyst under said adsorption conditions;

(2) cooling the regenerated catalyst and stripping residual sulfur and sulfur compounds from the regenerated catalyst by passing a portion of the acid gas feedstream through the regenerated catalyst in said Claus catalytic conversion zone at an inlet temperature below the inlet temperature of gas during the adsorption conditions and at a rate and for a time sufficient to cool the catalyst and to strip the sulfur and sulfur compounds from the catalyst; and (3) providing the resulting gas-in-process from step (2) containing the residual sulfur and sulfur compounds to a second Claus catalytic reaction zone.

3. The Process of claim 2 wherein the portion of acid gas feedstream is passed through catalyst in said Claus catalytic conversion zone at an inlet temperature less than about 300° F.

4. The Process of claim 2 wherein the portion of acid gas feedstream is passed through catalyst in said Claus catalytic conversion zone at an inlet temperature in the range of about 50° F. to about 180° F.

5. The Process of claim 2 wherein the step of passing a portion of the acid gas feedstream through catalyst in said Claus catalytic conversion zone is at an inlet temperature in the range of about 50° F. to about 140° F.

6. The Process of claim 2 wherein step (3) comprises:
adjusting the ratio of hydrogen sulfide:sulfur dioxide to about 2:1 in the resulting gas-in-process containing the stripped sulfur compounds and providing the thus adjusted gas-in-process to a downstream Claus catalytic reaction zone.

7. The Process of claim 2 further comprising:
operating said downstream Claus catalytic conversion zone under adsorption conditions including temperature for forming and depositing a preponderance of sulfur on catalyst therein.

8. The Process of claim 2 wherein said portion comprises at least about 1/6 of the acid gas feedstream to the Claus plant.

9. The Process of claim 2 wherein said portion comprises at least about ⅓ of the acid gas feedstream to the Claus plant.

10. The Process of claim 2 wherein said portion comprises about ⅔ of the acid gas feedstream to the Claus plant.

11. The Process of claim 2 wherein said portion comprises about all of the acid gas feedstream to the Claus plant.

12. The Process of claim 2 wherein the time of stripping is in the range of from about five (5) minutes to about three (3) hours.

13. The Process of claim 2 wherein the time of stripping is in the range of about thirty (30) minutes to about two (2) hours.

14. Process for the recovery of sulfur from an acid gas feedstream comprising as a sulfur species essentially only hydrogen sulfide, the processing comprising:

partially combusting hydrogen sulfide in the acid gas feedstream to sulfur dioxide in a thermal conversion zone and then reacting resulting sulfur dioxide with hydrogen sulfide in a Claus catalytic conversion zone in the presence of an effective Claus conversion catalyst for production of sulfur by the Claus reaction under adsorption conditions including temperature for forming and depositing a preponderance of the sulfur on catalyst therein;

then vaporizing thus deposited sulfur from the resulting sulfur-laden catalyst in the presence of a gas-in-process richer in hydrogen sulfide and sulfur dioxide than in the gas contacting the catalyst under said adsorption conditions;

then stripping residual sulfur and sulfur compounds from the catalyst freshly denuded of sulfur by passing a portion of the acid gas feedstream comprising as a sulfur species essentially only hydrogen sulfide through catalyst in said catalytic conversion zone at an inlet temperature less than the inlet temperature to said catalytic conversion zone during said adsorption conditions; and then returning the thus regenerated and conditioned catalyst to operation in a final position of a series of one or more Claus catalytic reaction zones operated under adsorption conditions, the feedstream being introduced into such zone under adsorption conditions being leaner in hydrogen sulfide and sulfur dioxide than the gas used for vaporizing elemental sulfur from the catalyst.

15. In a sulfur recovery process comprising passing an acid feed gas feedstream, having $H_2S$ as essentially the only sulfur species therein, to a Claus plant comprising (a) a thermal conversion zone, and (b) at least two Claus catalytic reaction zones, at least one of which is operated under adsorption conditions, including temperature, for forming and depositing a preponderance of sulfur formed on a catalyst therein while another catalytic reaction zone is being regenerated and/or cooled, the improvement comprising:
(1) regenerating the Claus catalyst in a first catalytic reactor zone by vaporizing sulfur deposited on the catalyst using a stream of gas-in-process whose temperature is above the sulfur dewpoint and whose composition is richer in $H_2S$ and $SO_2$ than the gas contacting the catalyst under said adsorption condition;
(2) cooling the regenerated catalyst and stripping residual sulfur and sulfur compound from the regenerated catalyst by passing a portion of the acid gas feedstream through the regenerated catalyst in said Claus catalytic conversion zone at an inlet temperature below the inlet temperature of gas during the adsorption conditions and at a rate and for a time sufficient to cool the catalyst and to strip the sulfur and sulfur compounds from the catalyst;
(3) providing the resulting gas-in-process from step (2) containing the residual sulfur and sulfur compounds to a second Claus catalytic reaction zone; and
(4) returning the catalytic reactor zone containing this thus regenerated and conditioned catalyst to operation in a final position of a series of two or more Claus catalytic reaction zones operated under adsorption conditions.

16. The Process of claim 15 wherein the portion of acid gas feedstream is passed through catalyst in said Claus catalytic conversion zone at an inlet temperature less than about 300° F.

17. The Process of claim 15 wherein the portion of acid gas feedstream is passed through catalyst in said Claus catalytic conversion zone at a temperature in the range of about 50° F. to about 180° F.

18. The Process of claim 15 wherein the step of passing a portion of the acid gas feedstream through catalyst in said Claus catalytic conversion zone is at an inlet temperature in the range of about 50° F. to about 140° F.

19. The Process of claim 15 wherein said portion comprises at least about 1/6 of the acid gas feedstream to the Claus plant.

20. The Process of claim 15 wherein said portion comprises at least about ⅓ of the acid gas feedstream to the Claus plant.

21. The Process of claim 15 wherein said portion comprises about ⅔ of the acid gas feedstream to the Claus plant.

22. The Process of claim 15 wherein said portion comprises about all of the acid gas feedstream to the Claus plant.

23. The Process of claim 15 wherein the time of stripping is in the range of from about five (5) minutes to about three (3) hours.

24. The Process of claim 15 wherein the time of stripping is in the range of about thirty (30) minutes to about two (2) hours.

25. The Process of claim 15 wherein:
said portion of the acid gas feedstream to the Claus plant is passed in contact with the freshly regenerated catalyst at a rate and for a period of time effective for reducing the sulfur emissions from the catalyst when operated under adsorption conditions to an amount no greater than the quantity of sulfur atoms in the form of elemental sulfur and sulfur compounds introduced into the catalytic conversion zone during adsorption conditions.

26. The Process of claim 15 wherein:
the acid gas feedstream to the Claus plant is passed in contact with the freshly regenerated catalyst at a rate and for a period of time effective to reduce the sulfur emissions from such catalyst when operated under adsorption conditions to less than about 10% higher than the emissions characteristic of such catalyst after the entire active bed of catalyst is cooled to its equilibrium temperature profile at the temperature of the inlet feedstream to such catalytic reactor when utilized under adsorption conditions.

* * * * *